| United States Patent [19] | [11] 3,715,314 |
| Morgenstern | [45] Feb. 6, 1973 |

[54] SCOURING CLEANSER COMPOSITION

[75] Inventor: Arthur Stanley Morgenstern, Wyoming, Ohio 45217

[73] Assignee: The Proctor & Gamble Company, Cincinnati, Ohio

[22] Filed: May 25, 1972

[21] Appl. No.: 256,684

Related U.S. Application Data

[63] Continuation of Ser. No. 130,859, April 2, 1971, abandoned.

[52] U.S. Cl. ...................252/95, 252/99, 252/187, 8/108
[51] Int. Cl. ...............................C11d 7/54
[58] Field of Search ...............252/95, 99, 187; 8/108

[56] References Cited

UNITED STATES PATENTS

| 3,382,182 | 5/1968 | Moyer | 252/95 X |
| 3,458,446 | 7/1969 | Diaz | 252/95 |

*Primary Examiner*—Mayer Weinblatt
*Attorney*—Richard C. Witte et al.

[57] ABSTRACT

An abrasive scouring cleanser composition consisting essentially of a water-insoluble siliceous abrasive material; an alkali metal carbonate; a water-soluble organic detergent; and calcium oxide or hydroxide. Compositions exhibiting desirable cleansing and scouring properties and effective in the removal of smears or deposits of soft metals such as aluminum or porcelain or ceramic surfaces are described.

12 Claims, No Drawings

SCOURING CLEANSER COMPOSITION

CROSS REFERENCE TO RELATED APPLICATION

This is a continuation of application Ser. No. 130,859 filed Apr. 2, 1971 now abandoned.

BACKGROUND OF THE INVENTION

This invention relates to abrasive scouring cleanser compositions. More particularly, it relates to scouring cleansers especially suited to the removal of aluminum smears from porcelain or ceramic surfaces.

The use of scouring cleanser compositions in the detergency arts has been well known. Generally, such scouring cleanser compositions comprise a water-insoluble abrasive scouring material, an alkaline inorganic salt for certain cleansing effects, particularly for grease removal, and a water-soluble organic soap or soap-like detergent material. The alkaline materials most commonly employed in such scouring compositions have been water-soluble inorganic alkaline builder salts such as the alkali metal phosphates, e.g., trisodium phosphate, tetrasodium pyrophosphate and sodium tripolyphosphate.

The present invention resides in scouring cleanser compositions having a water-soluble siliceous abrasive material, an alkali metal carbonate builder salt and a water-soluble detergent compound. While the use of an alkali metal carbonate builder salt in place of the more conventional phosphate builder salts such as trisodium orthophosphate permits the attainment of certain of the desirable advantages of scouring cleanser compositions, the use of such carbonate builders is attended by certain disadvantages, aluminum mark removal being particularly notable. In accordance with the present invention, it has been discovered that there can be prepared a scouring cleanser composition comprising an alkali metal carbonate builder salt and exhibiting both desirable cleansing properties and aluminum mark removal characteristics.

SUMMARY OF THE INVENTION

The present invention is based in part upon the discovery that the incorporation of calcium oxide, calcium hydroxide or a mixture thereof in a scouring cleanser composition permits the preparation of scouring cleanser compositions exhibiting desirable cleansing and scouring effects and having desirable aluminum mark removal properties. Accordingly, in its composition aspect, the present invention provides an abrasive scouring cleanser composition consisting essentially, by weight, of:

1. from 60 to 95 percent of a water-insoluble siliceous abrasive;
2. from 0.1 to 10 percent of a water-soluble organic detergent;
3. an alkali metal carbonate detergency builder salt; and
4. calcium oxide, calcium hydroxide or a mixture thereof;

the weight ratio of the calcium compound to the alkali metal carbonate builder salt being from 0.01:1 to 0.4:1.

It has been discovered that scouring cleanser compositions having an alkali metal carbonate builder salt and a calcium compound of the invention are surprisingly effective in the removal of aluminum smears from porcelain surfaces, such as those which are deposited on porcelain sink surfaces by contact with aluminum pots, pans and utensils incident to normal household cleansing and scouring operations.

DETAILED DESCRIPTION OF THE INVENTION

The abrasive materials of the scouring cleanser compositions of the invention are well known in the art and include water-insoluble siliceous abrasive materials such as silica, feldspar, pumice, volcanic ash, diatomaceous earth, bentonite, talc and the like. Silica and feldspar are preferred abrasive materials from the standpoint of their ready availability, cost, hardness and whiteness properties. The particle size, hardness and shape characteristics will vary depending upon the contemplated use of the scouring composition. Generally, the particle size of the scouring abrasive employed herein ranges in size from about 0.3 mm. diameter to about 0.001 mm. diameter and finer. Normally, at least about 80 percent of the abrasive materials will pass through a sieve having mesh openings of 0.074 mm. At least about 5 percent by weight of the abrasive material will remain on a sieve having mesh openings of 0.037 mm. The abrasive component comprises from 60 to 95 percent of the scouring cleanser compositions of the invention. Preferably, the abrasive material comprises from about 80 percent to about 90 percent by weight of the cleanser.

The water-soluble organic detergent component of the scouring cleanser compositions of the invention can be selected from the group consisting of soaps, anionic non-soap detergents, nonionic detergents, zwitterionic detergents, amphoteric detergents and mixtures thereof. Examples of suitable detergents for use in the scouring cleanser compositions of this invention include those detergents disclosed in U.S. Pat. No. 3,318,817 at column 4, line 37, through column 6, line 30, and column 9, line 6 through line 57, incorporated herein by reference.

While suitable detergent compounds of the invention include soap, non-soap anionic, nonionic, zwitterionic, and amphoteric detergents, preferred herein are the non-soap anionic detergents. Examples of these preferred anionic detergents are the water-soluble sulfated and sulfonated synthetic detergents. More particularly, it is preferred to employ an alkyl benzene sulfonate detergent wherein the alkyl group has from 8 to 18 carbon atoms. Suitable examples are sodium decyl benzene sulfonate, sodium dodecyl and pentadecyl sulfonates wherein the dodecyl and pentadecyl groups are derived from a propylene polymer, and sodium octadecyl benzene sulfonate. Other preferred anionic detergents are the surface-active sulfated or sulfonated aliphatic compounds, preferably having 8 to 22 carbon atoms. Examples thereof are the long-chain pure or mixed higher alkyl sulfates, e.g., lauryl sulfate and coconut fatty alcohol sulfate.

The anionic detergent components are commonly used in the form of their water-soluble salts. Preferred water-soluble cations are the alkali metal and ammonium cations, the sodium and potassium cations being particularly preferred.

The water-soluble detergent compounds can be employed in any amount which does not substantially effect the desired properties of the cleanser compositions of the invention. Generally, the detergent component is employed in an amount of from 0.1 to 15 percent by weight of the cleanser composition. Preferably, the detergent component is present in an amount of from 1 to 4 percent by weight of the compositions of the invention. It is preferred to employ the water-soluble detergent components in the form of an admixture with the alkaline carbonate builder salt, abrasive or other component of the compositions of the invention. An admixture containing the detergent component and alkali metal carbonate salt, for example, can be conveniently prepared by subjecting an aqueous slurry of the detergent and alkaline builder salt to conventional spray drying or drum drying to thereby form the mixture into a relatively dry and free-flowing homogeneous mixture. Alternatively, the detergent component and alkali metal carbonate builder can be prepared by contacting anhydrous or partially hydrated alkali metal carbonate salt with a slurry of the water-soluble detergent component. The carbonate builder salt by virtue of its hydration capacity, absorbs water from the aqueous detergent slurry to provide substantially dry and free-flowing agglomerates having the detergent component relatively disposed on the surfaces of the granular carbonate.

The alkali metal carbonate builder salts of the invention include the sodium and potassium carbonates. Especially preferred is sodium carbonate from the standpoints of providing desirable cleaning and building effects, cost and availability. Any of the sources of carbonate known in the detergent arts can be employed herein. Suitable carbonate sources include those available in the art as soda ash including the anhydrous, calcined or hydrated forms. Sodium or potassium sesquicarbonate can also be employed. The bicarbonate portion of mixtures commonly known in the art as sesquicarbonate, is believed to exist in the form of carbonate under the pH conditions of normal usage of the compositions of the invention in slurry form.

It is preferable, in the formulation of cleanser compositions of the invention, to employ the alkali metal carbonate in an anhydrous form so as to permit the preparation of a free-flowing and relatively non-agglomerating composition. The preferred anhydrous builder salts provide hydration capacity during formulation or storage of the compositions of the invention and permit the preparation of compositions which are substantially dry, i.e., solid compositions which are dry to the touch and which are substantially devoid of uncombined moisture. The compositions normally contain from 0.1% to about 1% water, preferably less than 0.75 percent by weight. Thus, it is preferred that the water-soluble alkali metal carbonate detergency builder component of the compositions of the invention be present in a hydratable form.

The calcium oxide, calcium hydroxide or mixtures thereof suitable in the compositions of the invention include any of the calcium oxide, hydroxide and lime sources known in the art. Thus, materials commonly known as calcium hydrate, lime, caustic or slaked lime or quicklime are suitable herein. Certain lime sources will vary in their content of calcium compounds. Commercial lime sources which contain from about 50 to about 92 percent calcium hydroxide or oxide are suited herein. Dolomite lime, for example, provides desirable aluminum mark removal properties and comprises about 55 percent calcium hydroxide and about 45 percent magnesium oxide. It is preferred in formulating the compositions of the invention to employ anhydrous calcium compounds so as to minimize the effects of moisture, particularly in those having a hypochlorite-releasing bleach source.

The amount of the calcium compound in the scouring cleanser compositions of the invention is an amount at least sufficient to provide desired aluminum mark removal from ceramic surfaces. An amount corresponding to a weight ratio of calcium compound to alkali metal carbonate builder salt of from 0.01:1 to 0.4:1 is employed. Preferably, the ratio ranges from 0.02:1 to 0.3:1. It has been observed that while the alkali metal carbonate builder salt is effective to provide enhanced cleansing properties, the amount of such builder salt employed can have an adverse effect on aluminum mark removal properties. Accordingly, the employment of amounts of calcium compound and alkali metal carbonate corresponding to the hereinbefore described ranges constitutes an essential aspect of the present invention. Normally, the scouring cleanser compositions of the invention contain an alkali metal carbonate builder salt and calcium component in a combined weight of from 5 to 39 percent and preferably from 8 to 15 percent. The compositions exhibit a pH of from 11.0 to 12.5 when formed into a 25 percent aqueous slurry. A preferred pH range is from 11.5 to 12.0.

A preferred abrasive cleanser composition prepared in accordance with the present invention consists essentially of:

1. from about 1 to about 4 percent of a compatible water-soluble organic detergent,
2. from 8 to 14 percent of sodium carbonate;
3. from 0.3 to 1 percent calcium oxide or hydroxide;
4. from 80 to about 90 percent of a siliceous abrasive material; and
5. from 0.2 to 1 percent of an alkali metal dichlorocyanurate.

The scouring cleanser compositions of the invention exhibit their aluminum mark removal properties for an indefinite period of time. The tendency of such properties to be retained upon storage is a preferred characteristic of the compositions of the invention. While the alkalinity provided by the incorporation of sodium hydroxide into an abrasive scouring cleanser composition permits the preparation of a composition having excellent aluminum mark removal properties, such properties tend to deteriorate upon allowing the composition to stand for an indefinite period of time. Thus, the aluminum mark removal compositions observed in the case of a freshly-prepared scouring composition having sodium hydroxide tend to be reduced upon storage, particularly under conditions of high humidity. While applicant does not wish to be bound by any precise theory or mechanism, it is believed that sodium hydroxide undergoes reaction with a siliceous abrasive material to form a soluble sodium silicate which is believed to exert a protective or corrosion-inhibiting effect in preventing aluminum mark removal. In contrast to the formation of soluble sodium silicate, the calcium oxide or hydroxide component of the scouring cleanser compositions of the invention is believed to be substantially inert to siliceous abrasive or to form a water-insoluble complex.

It is a preferred embodiment of the present invention that the scouring cleanser compositions contain a bleaching agent to provide effective bleaching and sanitizing action. The bleaching agent can be incorporated into the composition of the invention in any suitable manner, such as during or after the mixing of the essential ingredients. Examples of suitable bleaching agents are the known oxygen- and chlorine-releasing substances, such as sodium perborate, sodium, calcium and lithium hypochlorite, dichlorocyanuric acid, sodium and potassium dichlorocyanurate, trichlorocyanuric acid, Chloramine T, dichlorodimethyl hydantoin and the like. The amount of bleaching agent is not critical but will be usually from about 0.1 to 25 percent of the composition of the invention.

Various known materials can be incorporated into the compositions of the invention as desired. Suitable examples of such materials are minor amounts of anti-caking agents such as hydrated magnesium trisilicate, sodium carboxymethylcellulose, sulfamic acid, perfume, antiseptics, germicides, skin emollient materials and the like. The compositions can also contain other compatible water-soluble inorganic salts such as sodium sulfate. In order to maintain the substantially dry form of the compositions of the invention, it is desirable that these compositions be packaged in moisture-impermeable materials, e.g., plastic, glass, metal, fiber cans with interior wax coating or metal foil.

The following examples are illustrative of the present invention and it will be understood that the invention is not limited thereto. All parts and percentages are by weight unless otherwise specified.

EXAMPLE I

In all of the examples herein, the silica and sodium alkyl benzene sulfonate components had the following descriptions, except as noted:

The silica abrasive contained about 99.8 parts silica, approximately 0.2 parts moisture and about 0.03 parts pigment. The particle size varied from about 5 microns to about 50 microns with the major portion of the particles being in the range from about 10 microns to about 20 microns.

The sodium alkyl benzene sulfonate had a distribution of $C_{10}$ to $C_{14}$ alkyl chains and an average of $C_{11.8}$. In Examples I to III, the sodium alkyl benzene sulfonate was prepared into a premix with the sodium carbonate by spraying 3.7 parts of an aqueous slurry (60 percent sodium alkyl benzene sulfonate; 1.5 percent sodium sulfate; 0.5 percent sodium xylene sulfonate; 38 percent water) onto 10 parts of anhydrous sodium carbonate. The resulting agglomerate was ground to provide a distribution of particle sizes permitting admixture with the remaining components.

An abrasive scouring cleanser composition was prepared by dry mixing:

| | Parts by weight |
|---|---|
| Calcium hydroxide | 0.60 |
| Sodium carbonate/sodium alkyl benzene sulfonate premix (10 parts sodium carbonate, anhydrous basis; 2.2 parts sodium benzene sulfonate; 1.2 parts water, sodium xylene sulfonate and sodium sulfate) | 12.2 |
| Potassium dichlorocyanurate | 1.0 |
| Sodium sulfamate | 0.2 |
| Perfume | 0.15 |
| Silica | Balance to 100 |
| pH (25% aqueous slurry) | 11.7 |

The composition of Example I was evaluated for its aluminum mark removal (AMR) by employing the following test methods.

Method A

Approximately 0.5 g of powdered aluminum is sprinkled onto an abraded porcelain panel and rubbed lightly with a soft tissue until the surface of the panel is uniformly coated with aluminum. The excess powder is brushed from the panel. Five grams of the composition to be tested are placed in a 50 ml. beaker and 15 ml. of distilled water are added. The mixture is stirred immediately. Using an eye dropper, a few drops of the slurry are placed onto the panel within 15 to 30 seconds from the addition of water. The slurry is allowed to remain on the panel for three minutes. The panel is rinsed and dried. The amount of aluminum removed from the test panel is inspected and the percentage removed is estimated visually to the nearest 10 percent. Method B A porcelain plate is etched for 5 minutes in a 1 percent oxalic acid solution. An aluminum mark is prepared by wetting the etched porcelain plate and sprinkling aluminum powder upon it. The powder is rubbed onto the plate until a uniformly dark aluminum mark appears. The plate is rinsed and the excess aluminum powder is rubbed off. In preparing the plate a paper towel is used for rubbing the aluminum and in cleaning the plate. A 25 percent slurry of the composition to be tested is prepared. With a freshly made slurry, a drop of the slurry is applied to the plate and allowed to react for 30 seconds. The plate is rinsed and blotted dry and the aluminum removal is graded. Using a second fresh slurry, a drop is applied to the plate and allowed to react for 3 minutes. The plate is rinsed, blotted dry and graded. Performance during the short reaction time (30 seconds) is an indication of aluminum mark removal speed. Performance during the longer reaction time (3 minutes) is an indication of aluminum mark removal capacity. Grading is conducted by comparing the aluminum mark removal of the composition tested with the aluminum mark removal attained by a sodium hydroxide standard. Sodium hydroxide aluminum mark removal is determined by the action of a 5 percent sodium hydroxide solution on a portion of the aluminum mark on the porcelain plate on which the sample is tested. On a one-to-10 scale, a grade of three corresponds to the aluminum mark removal of a 5 percent sodium hydroxide solution placed on an aluminum mark for 10 seconds. A grade of five corresponds to the removal attained from a 5 percent sodium hydroxide solution in 20 seconds. Similarly, grades of eight and 10, respectively, correspond to the aluminum mark removal attained by the employment of a 5 percent sodium hydroxide solution in 35 and 45 seconds, respectively.

The composition of Example I was evaluated for aluminum mark removal properties with the following results:

ALUMINUM MARK REMOVAL

| Composition | Method A (% removal) | Method B (3 min.) | (30 sec.) |
|---|---|---|---|
| Example I | 95 | 8 | 2 |

EXAMPLE II

An abrasive scouring cleanser was prepared by dry mixing:

| | Parts by weight |
|---|---|
| Calcium oxide | 0.45 |
| Sodium carbonate/sodium alkyl benzene sulfonate premix of Example I | 13.4 |
| Potassium dichlorocyanurate | 1.0 |
| Sodium sulfamate | 0.2 |
| Perfume | 0.15 |
| Silica | Balance to 100 |
| pH (25% aqueous slurry) | 11.7 |

The composition of Example II was evaluated for aluminum mark removal properties with the following results:

ALUMINUM MARK REMOVAL

| Composition | Method A (% removal) | Method B (3 min.) | (30 sec.) |
|---|---|---|---|
| Example II | 95 | 6 | 1 |

EXAMPLE III

An abrasive scouring composition was prepared by dry mixing:

| | Parts by weight |
|---|---|
| Lime (55% calcium hydroxide; 45% magnesium oxide) | 1.0 |
| Sodium carbonate/sodium alkyl benzene sulfonate of Example I | 13.4 |
| Potassium dichlorocyanurate | 1.0 |
| Sodium sulfamate | 0.2 |
| Perfume | 0.15 |
| Silica | Balance to 100 |
| pH (25% aqueous slurry) | 11.8 |

The composition of Example III was evaluated for aluminum mark removal properties employing a freshly-prepared sample and a sample that had been aged for 6 weeks under ambient room temperature and humidity conditions.

ALUMINUM MARK REMOVAL

| Composition | Method A (% removal) | Method B (3 min.) | (30 sec.) |
|---|---|---|---|
| Example III (fresh) | 85 | 7 | 0 |
| Example III (aged) | 90 | 5 | 1 |

As is apparent from the data of Example III, the aluminum mark removal properties were essentially unchanged by storage.

EXAMPLES IV TO VIII

Abrasive scouring compositions having the following ingredients were prepared:

| | IV | V | VI | VII | VIII |
|---|---|---|---|---|---|
| Calcium hydroxide | 0.5 | 1.0 | 1.5 | 1.0 | 2.0 |
| Sodium carbonate (anhydrous basis) | 6.5 | 6.0 | 5.5 | 5.0 | 5.0 |
| Sodium alkyl benzene sulfonate | 2.2 | 2.2 | 2.2 | 2.2 | 2.2 |
| Potassium dichlorocyanurate | 1.0 | 1.0 | 1.0 | 1.0 | 1.0 |
| Sodium sulfamate | 0.2 | 0.2 | 0.2 | 0.2 | 0.2 |
| Miscellaneous (water; sodium xylene sulfonate; sodium sulfonate) | 1.2 | 1.2 | 1.2 | 1.2 | 1.2 |
| Silica (Example I except unpigmented) | | | Balance to 100 | | |
| pH (25% aqueous slurry) | 10.9 | 12.2 | 12.4 | 12.3 | 12.7 |

The compositions of Examples IV to VIII were evaluated for their aluminum mark removal properties with the following results:

ALUMINUM MARK REMOVAL

| Composition | Method A (% removal) | Method B (3 min.) | (30 sec.) |
|---|---|---|---|
| Example IV | 30 | 3 | 1 |
| Example V | 90 | 4 | 2 |
| Example VI | 80 | 2 | 0 |
| Example VII | 90 | 4 | 2 |
| Example VIII | 25 | 2 | 1 |

Compositions A to D having the following compositions were prepared and evaluated for aluminum mark removal properties. Compositions A to D are presented for comparison with compositions IV to VIII of the invention.

| | Parts by weight | | | |
|---|---|---|---|---|
| | A | B | C | D |
| Calcium hydroxide | 7 | 3.5 | 5 | — |
| Sodium carbonate (anhydrous basis) | — | 3.5 | 2 | 7 |
| Sodium alkyl benzene sulfonate | 2.2 | 2.2 | 2.2 | 2.2 |
| Potassium dichlorocyanurate | 1.0 | 1.0 | 1.0 | 1.0 |
| Sodium sulfamate | 0.2 | 0.2 | 0.2 | 0.2 |
| Silica | | Balance to 100 | | |
| pH (25% aqueous slurry) | 12.4 | 12.8 | 12.7 | 10.6 |

Compositions A to D were evaluated for aluminum mark removal properties with the following results:

ALUMINUM MARK REMOVAL

| Composition | Method A (% removal) | Method B (3 min.) | (30 sec.) |
|---|---|---|---|
| A | 90 | 5 | 1 |
| B | 0 | 0 | 0 |
| C | 0 | 0 | 0 |
| D | 20 | 2 | 1 |

Composition A provides desirable aluminum mark removal properties but contains no carbonate builder. Composition D illustrates the aluminum mark removal properties of a composition having no calcium compound but having a carbonate builder salt; the improved properties of compositions of the invention are apparent. Compositions B and C illustrate the undesirable aluminum mark removal properties of compositions having a ratio of calcium compound to sodium carbonate builder salt of 1:1 and 2.5:1, respectively.

EXAMPLES IX TO XIV

Abrasive scouring cleanser compositions having aluminum mark removing properties are prepared by dry mixing:

| | Parts by weight | | | | | |
|---|---|---|---|---|---|---|
| | IX | X | XI | XII | XIII | XIV |
| Sodium dodecyl benzene sulfonate | 4 | 5 | 10 | 3 | 5 | 2 |
| Sodium carbonate | — | 10 | 8 | 12 | 14 | 10 |
| Potassium carbonate | 12 | — | 7 | — | — | 1 |
| Calcium oxide | — | 0.6 | 1 | — | 1 | 0.4 |
| Calcium hydroxide | — | 0.2 | — | — | — | 0.2 |
| Lime (60/40% calcium and magnesium oxides) | 1 | — | — | 1 | — | — |
| Sodium dichlorocyanurate | — | — | 1 | 1.5 | 1 | — |
| Trichlorocyanuric acid | — | 1 | — | — | — | — |
| Silica of Example I | | | Balance to 100 | | | |

When in the above examples the following detergents are substituted either wholly or in part (e.g., 1:1 ratio by weight) for the sodium alkyl benzene sulfonate detergent substantially equivalent results are obtained in that the compositions are effective aluminum mark removing compositions.

Sodium and/or potassium
a. coconut soap;
b. Tallow soap;
c. Alkyl sulfate wherein the alkyl is derived from coconut oil;
d. Alkyl sulfate wherein the alkyl radical is derived from tallow;
e. Alkyl sulfonates prepared by sulfonating alpha olefins containing an average of about 12 carbon atoms;
f. Alkyl benzene sulfonates containing straight alkyl chains containing an average of about 12 carbon atoms;
g. Alkyl glyceryl ether sulfonates wherein the alkyl group is derived from coconut oil;
h. Coconut oil fatty acid monoglyceride sulfates wherein the fatty acid group is derived from coconut oil;
i. Fatty acid monoglyceryl sulfonates wherein the fatty acid group is derived from coconut oil;
j. Alkyl ethylene oxide sulfates wherein the alkyl radical is derived from tallow, and where there are about 3 moles of ethylene oxide per mole of fatty alcohol;
k. Alkyl phenol ethylene oxide sulfates containing about 4 units of ethylene oxide per molecule in which the alkyl radical contains about 9 carbon atoms;
l. Fatty acyl isethionates wherein the fatty acyl groups are derived from coconut oil;
m. The condensation product of ethylene oxide with a condensation product of propylene oxide and propylene glycol, the ethylene oxide constituting 50 percent of the total weight of the condensation product and the total molecular weight of the condensation product being about 3,600;
n. Alkyl phenol ethylene oxides wherein the alkyl group contains about 12 carbon atoms and there are approximately 10 moles of ethylene oxide per mole of alkyl phenol the condensation product of alcohols derived from coconut oil and about 10 moles of ethylene oxide per mole of coconut alcohol;
o. Dodecyl dimethyl amine oxide;
p. Tetradecyl dimethyl phosphine oxide;
q. 3-(N,N-dimethyl-N-hexadecylammonio)-propane-1-sulfonate;
r. 3-(N,N-dimethyl-N-coconutalkylammonio)-2-hydroxy-propane-1-sulfonate;
s. 3-(N,N-diethyl-N-hexadecylammonio)-propane-1-carboxylate;
t. Dodecyl-beta-alanine;
u. N-dodecyl taurine;
v. N-dodecylaspartate;
w. Coconut Alkyl triethylamine chloride;
x. dodecyl dimethylbenzylbromide
y. dodecyl methyl morpholine methylsulfate;
z. dodecyl methyl pyridene nitrate; and Mixtures thereof, e.g., 1:1 mixtures of coconut soap and alkyl sulfonates; alkyl sulfates and alkyl benzene sulfonates; coconut oil fatty acid monoglyceride sulfates and fatty acyl isethionates; and alkyl phenol ethylene oxide and dodecyl dimethyl amine oxide.

When in the above examples the following abrasives are substituted, either wholly or in part, (e.g., a 1:1 ratio by weight), for the silica abrasive, substantially equivalent results are obtained in that the compositions are effective in removing aluminum marks and for cleaning. Feldspar, pumice, pumicite, zirconium silicate, volcanic ash, diatomaceous earth, china clay, whiting, bentonite, talc, calcium carbonate and aluminum oxide where the above abrasives have the same particle size as the silica in the above Examples.

What is claimed is:

1. An abrasive scouring cleanser composition consisting essentially of from 60 to 95 percent by weight of a water-insoluble siliceous abrasive; from 0.1 to 10 percent by weight of a water-soluble organic detergent; and alkali metal carbonate detergency builder salt; and a calcium compound selected from the group consisting of calcium oxide, calcium hydroxide and mixtures thereof; the weight ratio of the calcium compound to the alkali metal carbonate builder salt being from 0.01:1 to 0.4:1.

2. The abrasive scouring cleanser composition of claim 1 wherein the water-insoluble siliceous abrasive has a particle size less than about 0.3 mm. in diameter.

3. The abrasive scouring cleanser composition of claim 2 wherein the water-insoluble siliceous abrasive is present in an amount of from about 80 to about 90 percent by weight.

4. The abrasive scouring cleanser composition of claim 1 wherein the water-soluble organic detergent is a water-soluble synthetic anionic detergent.

5. The abrasive scouring cleanser composition of claim 4 wherein the water-soluble synthetic anionic detergent is an alkylbenzene sulfonate and is present in an amount of from 1 percent to 4 percent by weight.

6. The abrasive scouring cleanser composition of claim 1 wherein calcium compound is calcium oxide and the alkali metal carbonate detergency builder salt is sodium carbonate.

7. The abrasive scouring cleanser composition of claim 6 wherein the weight ratio of calcium oxide to sodium carbonate ranges from 0.02:1 to 0.3:1.

8. The abrasive scouring cleanser composition of claim 1 wherein the calcium compound is calcium hydroxide and the alkali metal carbonate is sodium carbonate.

9. The abrasive scouring cleanser composition of claim 8 wherein the weight ratio of calcium hydroxide to sodium carbonate ranges from 0.02:1 to 0.3:1.

10. The abrasive scouring cleanser composition of claim 1 wherein the calcium compound is lime, the alkali metal carbonate is sodium carbonate and the ratio of lime to sodium carbonate ranges from 0.02:1 to 0.3:1.

11. The abrasive scouring cleanser composition of claim 1 wherein the alkali metal carbonate is sodium carbonate and is present in an amount of from 8 percent to 14 percent; and the calcium compound is calcium oxide or hydroxide and is present in an amount of from 0.3 percent to 1 percent.

12. The abrasive scouring cleanser composition of claim 11 wherein from 0.2 percent to 1 percent by weight of an alkali metal salt of dichlorocyanuric acid is present.

* * * * *